United States Patent
Park et al.

(10) Patent No.: US 9,777,112 B2
(45) Date of Patent: *Oct. 3, 2017

(54) COPOLYCARBONATE RESIN COMPOSITION

(71) Applicant: LG CHEM, LTD., Seoul (KR)

(72) Inventors: Jung Jun Park, Daejeon (KR); Young Young Hwang, Daejeon (KR); Moo Ho Hong, Daejeon (KR); Hyong Min Bahn, Daejeon (KR); Hee Yong Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/028,833

(22) PCT Filed: Dec. 3, 2015

(86) PCT No.: PCT/KR2015/013158
§ 371 (c)(1),
(2) Date: Apr. 12, 2016

(87) PCT Pub. No.: WO2016/089136
PCT Pub. Date: Jun. 9, 2016

(65) Prior Publication Data
US 2016/0326312 A1 Nov. 10, 2016

(30) Foreign Application Priority Data

Dec. 4, 2014 (KR) .................. 10-2014-0173005
Dec. 2, 2015 (KR) .................. 10-2015-0170811

(51) Int. Cl.
| | | |
|---|---|---|
| C08L 69/00 | (2006.01) | |
| C08G 64/18 | (2006.01) | |
| C08G 64/08 | (2006.01) | |
| C08G 64/38 | (2006.01) | |
| C08G 77/448 | (2006.01) | |
| C08J 5/00 | (2006.01) | |

(Continued)

(52) U.S. Cl.
CPC ........... *C08G 64/085* (2013.01); *C08G 64/06* (2013.01); *C08G 64/1666* (2013.01); *C08G 64/1691* (2013.01); *C08G 64/18* (2013.01); *C08G 64/186* (2013.01); *C08G 64/24* (2013.01); *C08G 64/307* (2013.01); *C08G 64/38* (2013.01); *C08G 77/448* (2013.01); *C08J 5/00* (2013.01); *C08K 5/3475* (2013.01); *C08L 69/00* (2013.01); *C08L 69/005* (2013.01); *C08L 83/04* (2013.01); *C08L 83/10* (2013.01); *C08L 2201/10* (2013.01); *C08L 2205/02* (2013.01); *C08L 2205/025* (2013.01)

(58) Field of Classification Search
CPC ........................... C08G 64/085; C08G 77/448
See application file for complete search history.

(56) References Cited

U.S. PATENT DOCUMENTS

| | | | |
|---|---|---|---|
| 3,819,744 A | * | 6/1974 | Buchner ............ C08G 77/448 525/464 |
| 5,137,949 A | | 8/1992 | Paul et al. |

(Continued)

FOREIGN PATENT DOCUMENTS

| | | |
|---|---|---|
| CN | 101124282 A | 2/2008 |
| CN | 101585961 A | 11/2009 |

(Continued)

OTHER PUBLICATIONS

Chemical Abstract of US2016/0251481, Mar. 2016, 3 pages.
Chemical Abstract registry No. 163617-O0-3, Jun. 1995, 1 page.

*Primary Examiner* — David Buttner
(74) *Attorney, Agent, or Firm* — Dentons US LLP

(57) ABSTRACT

Disclosed is a copolycarbonate composition including: a copolycarbonate having an aromatic polycarbonate-based first repeating unit and one or more aromatic polycarbonate-based second repeating units having siloxane bonds; and a polycarbonate, where the copolycarbonate composition has an impact strength at room temperature of 830 to 1000 J/m as measured at 23 ° C. in accordance with ASTM D256 (⅛ inch, Notched Izod), where the one or more aromatic polycarbonate-based second repeating units having siloxane bonds include a repeating unit represented by Chemical Formula 2 and a repeating unit represented by Chemical Formula 3:

[Chemical Formula 2]

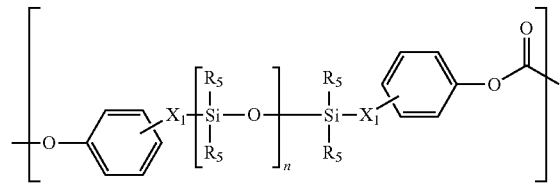

[Chemical Formula 3]

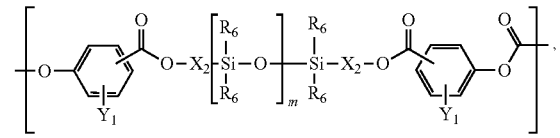

and where the copolycarbonate composition satisfies the following Equation 1:

$$1.0682 \times X + 0.51 < Y < 1.0682 \times X + 1.2. \quad \text{[Equation 1]}$$

The copolycarbonate composition provides an improved mobility.

10 Claims, 1 Drawing Sheet

(51) Int. Cl.
| | | |
|---|---|---|
| *C08G 64/16* | (2006.01) | |
| *C08G 64/06* | (2006.01) | |
| *C08G 64/30* | (2006.01) | |
| *C08K 5/3475* | (2006.01) | |
| *C08L 83/04* | (2006.01) | |
| *C08G 64/24* | (2006.01) | |
| *C08L 83/10* | (2006.01) | |

(56) References Cited

U.S. PATENT DOCUMENTS

| | | |
|---|---|---|
| 5,324,454 A | 6/1994 | Takata et al. |
| 5,380,795 A | 1/1995 | Gosens et al. |
| 5,455,310 A | 10/1995 | Hoover et al. |
| 5,502,134 A | 3/1996 | Okamoto et al. |
| 5,608,026 A | 3/1997 | Hoover et al. |
| 5,783,651 A | 7/1998 | König et al. |
| 5,932,677 A | 8/1999 | Hoover et al. |
| 6,001,929 A | 12/1999 | Nodera et al. |
| 6,252,013 B1 | 6/2001 | Banach et al. |
| 6,281,286 B1 | 8/2001 | Chorvath et al. |
| 6,780,956 B2 | 8/2004 | Davis |
| 7,135,538 B2 | 11/2006 | Glasgow et al. |
| 7,332,559 B2 | 2/2008 | Hong et al. |
| 7,432,327 B2 | 10/2008 | Glasgow |
| 7,498,401 B2 | 3/2009 | Agarwal |
| 7,524,919 B2 | 4/2009 | Hoover et al. |
| 7,691,304 B2 | 4/2010 | Agarwal et al. |
| 7,709,581 B2 | 5/2010 | Glasgow et al. |
| 7,718,733 B2 | 5/2010 | Juikar et al. |
| 8,030,379 B2 | 10/2011 | Nodera et al. |
| 8,084,134 B2 | 12/2011 | Malinoski et al. |
| 8,124,683 B2 | 2/2012 | Jung et al. |
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 | 2/2016 | Park et al. |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | DeRudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1* | 12/2009 | Schultz .............. C08G 64/186 528/196 |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1 | 10/2012 | Rosenquist et al. |
| 2012/0283393 A1 | 11/2012 | Ishikawa |
| 2013/0003544 A1 | 1/2013 | Wermuth et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317150 A1 | 11/2013 | Wan et al. |
| 2013/0331492 A1 | 12/2013 | Sharma |
| 2014/0106208 A1 | 4/2014 | Ishikawa et al. |
| 2014/0148559 A1 | 5/2014 | Kim et al. |
| 2014/0178943 A9 | 6/2014 | Shibuya et al. |
| 2014/0179843 A1 | 6/2014 | van der Mee et al. |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0197633 A1 | 7/2015 | van der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1 | 11/2015 | Bahn et al. |
| 2015/0344623 A1 | 12/2015 | Park et al. |
| 2015/0368484 A1 | 12/2015 | Shishaku et al. |
| 2016/0002410 A1* | 1/2016 | Iyer .................. C08G 77/448 525/464 |
| 2016/0122477 A1 | 5/2016 | Rhee et al. |
| 2016/0251481 A1 | 9/2016 | Hwang et al. |
| 2016/0297926 A1* | 10/2016 | Hwang .............. C08G 64/307 |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 2014080496 * | 5/2014 |
| JP | 5547953 B2 | 7/2014 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 1020080083278 A | 9/2008 |
| KR | 10-2009-0033093 A | 4/2009 |
| KR | 10-1007451 B1 | 1/2011 |
| KR | 2011-0068682 A | 6/2011 |

(56) References Cited

FOREIGN PATENT DOCUMENTS

| | | |
|---|---|---|
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| TW | 201241043 A | 10/2012 |
| WO | 2012060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/175445 A2 | 11/2013 |
| WO | 2013175455 A1 | 11/2013 |
| WO | 2014042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014-144673 A1 | 9/2014 |
| WO | 2015/011669 A2 | 1/2015 |
| WO | 2015/015445 A2 | 2/2015 |
| WO | WO-2015041441 * | 3/2015 |

* cited by examiner

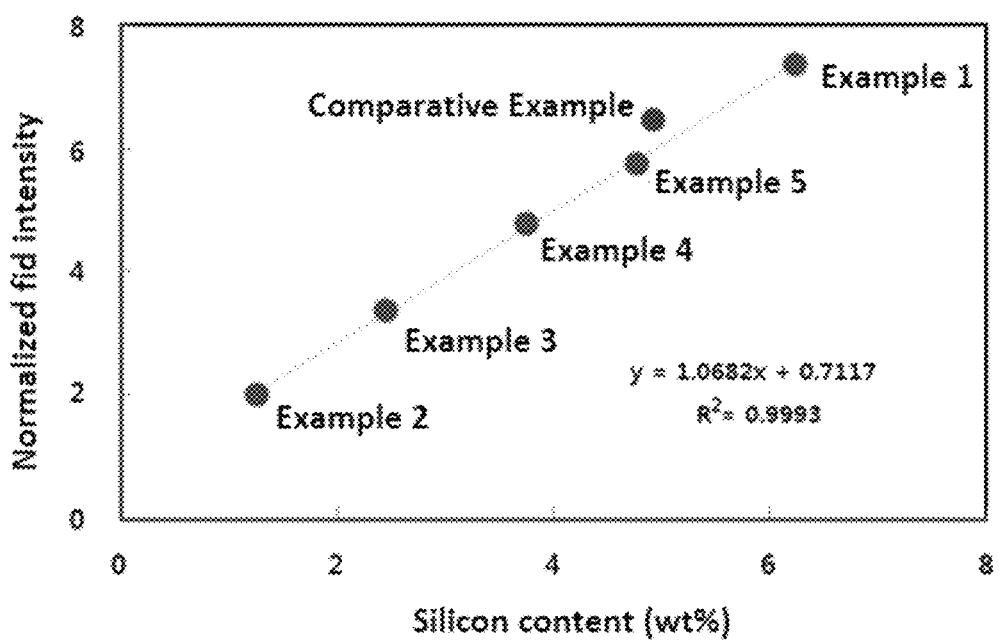

COPOLYCARBONATE RESIN COMPOSITION

CROSS-REFERENCE TO RELATED APPLICATION(S)

This application is a National Stage Entry of International Application No. PCT/KR2015/013158, filed on Dec. 3, 2015, and claims the benefit of and priority to Korean Application No. 10-2014-0173005, filed on Dec. 4, 2014, and Korean Application No. 10-2015-0170811, filed on Dec. 2, 2015, all of which are incorporated herein by reference in their entirety for all purposes as if fully set forth herein.

TECHNICAL FIELD

The present invention relates to a copolycarbonate composition which has various excellent physical properties.

BACKGROUND OF ART

Polycarbonate resins are prepared by condensation-polymerization of an aromatic diol such as bisphenol A with a carbonate precursor such as phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and when chemical resistance or impact strength, particularly impact strength at low temperature are increased, the melt index or the like are conversely lowered. Therefore, in order to improve various physical properties simultaneously, the chemical structure of polycarbonate, the mobility of the polycarbonate chains and the like should be multilaterally considered. In the present invention, the mobility of the molecule was analyzed through a TD (Time-domain)-NMR FID experiment.

Important NMR information that appears on the FID signal pattern is T2 relaxation time, which appears the difference depending on the flexibility of the molecular structure, and the decay rate changes in the FID signal accordingly. In other words, the more rigid the molecule, the FID decay rate is faster. Also, the more flexible the molecular, the FID decay rate is slower.

In this regard, the present inventors have conducted TD (Time-domain)-NMR FID analysis of a copolycarbonate composition comprising a copolycarbonate in which a polysiloxane structure is introduced in a main chain of the polycarbonate, and optionally a polycarbonate, and prepared a copolycarbonate composition which has various excellent physical properties.

DETAILED DESCRIPTION OF THE INVENTION

Technical Problem

It is an object of the present invention to provide a copolycarbonate composition comprising a copolycarbonate and optionally a polycarbonate.

It is another object of the present invention to provide an article comprising the above-mentioned copolycarbonate composition.

Technical Solution

In order to achieve the above objects, the present invention provides a copolycarbonate composition which comprises i) a copolycarbonate comprising an aromatic polycarbonate-based first repeating unit; and one or more aromatic polycarbonate-based second repeating units having siloxane bonds, or ii) the copolycarbonate and polycarbonate, wherein the copolycarbonate composition satisfies the following Equation 1:

$$1.0682 \times X + 0.51 < Y < 1.0682 \times X + 1.2 \quad \text{[Equation 1]}$$

in the Equation 1,

X means a silicon content (wt. %) relative to the total weight of the copolycarbonate and polycarbonate, and Y means a value in which the FID intensity obtained through TD (Time-domain) FID experiment is normalized at 0.1 msec.

Hereinafter, the present invention will be described in detail, and for convenience of classification and description of the respective components, the copolycarbonate is represented by 'A', and the polycarbonate is represented by 'B'.

Copolycarbonate (A)

The copolycarbonate (A) as used herein refers to a polymer in which a polysiloxane structure is introduced in a main chain of the polycarbonate.

Specifically, the aromatic polycarbonate-based first repeating unit is formed by reacting an aromatic diol compound and a carbonate precursor, and it may be preferably represented by the following Chemical Formula 1:

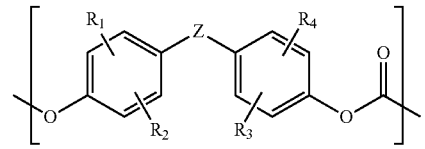

[Chemical Formula 1]

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, $R_1$, $R_2$, $R_3$ and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

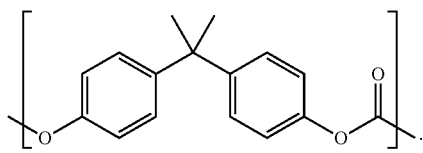

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate.

Preferably, triphosgene or phosgene may be used.

Further, the one or more aromatic polycarbonate-based second repeating units having siloxane bonds are formed by reacting one or more siloxane compounds and a carbonate precursor, and it may comprise preferably a repeating unit represented by the following Chemical Formula 2 and a repeating unit represented by the following Chemical Formula 3:

[Chemical Formula 2]

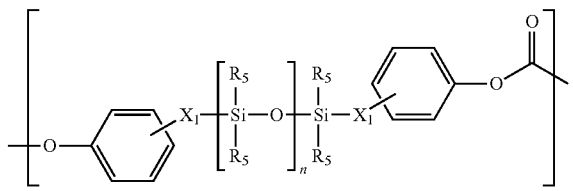

in the Chemical Formula 2,
each of $X_1$ is independently $C_{1-10}$ alkylene,
each of $R_5$ is independently hydrogen; alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n is an integer of 10 to 200, in the Chemical Formula 3,
each of $X_2$ is independently $C_{1-10}$ alkylene,
each of $Y_1$ is independently hydrogen, $C_{1-6}$ alkyl, halogen, hydroxy, $C_{1-6}$ alkoxy, or $C_{6-20}$ aryl,
each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 10 to 200.

In Chemical Formula 2, each of $X_1$ is independently preferably $C_{2-10}$ alkylene, more preferably $C_{2-4}$ alkylene, and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 50, not more than 45, not more than 40, not more than 39, not more than 38, or not more than 37.

In Chemical Formula 3, each of $X_2$ is independently preferably $C_{2-10}$ alkylene, more preferably $C_{2-6}$ alkylene, and most preferably isobutylene.

Further, preferably, $Y_1$ is hydrogen.

Further, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each of $R_6$ is independently $C_{1-10}$ alkyl, more preferably $C_{1-6}$ alkyl, more preferably $C_{1-3}$ alkyl, and most preferably methyl.

Preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are, respectively, derived from a siloxane compound represented by the following Chemical Formula 2-1 and a siloxane compound represented by the following Chemical Formula 3-1:

[Chemical Formula 3]

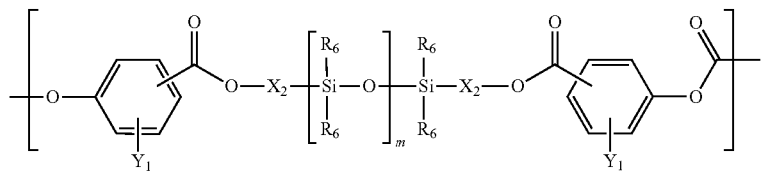

[Chemical Formula 2-1]

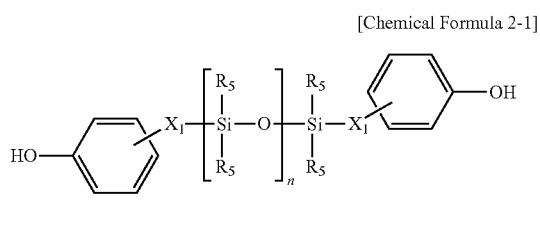

in the Chemical Formula 2-1, $X_1$, $R_5$ and n are the same as previously defined.

[Chemical Formula 3-1]

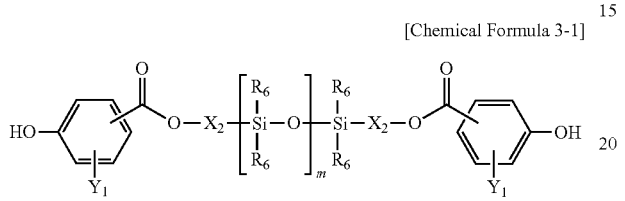

In the Chemical Formula 3-1, $X_2$, $Y_1$, $R_6$ and m are the same as previously defined.

As used herein, 'derived from a siloxane compound' means that a hydroxy group of the respective siloxane compound and a carbonate precursor are reacted to form the repeating unit represented by Chemical Formula 2 and the repeating unit represented by Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2, respectively.

[Reaction Scheme 1]

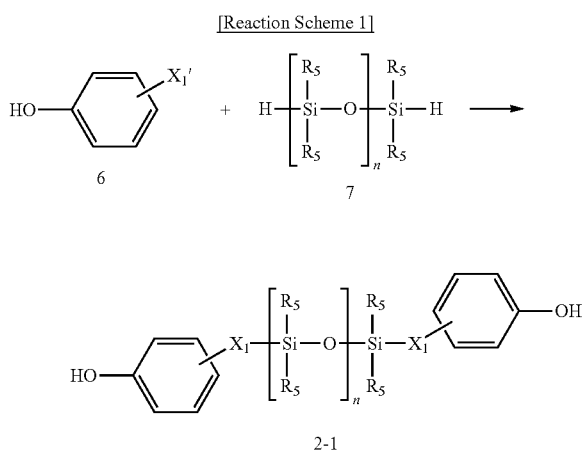

in the Reaction Scheme 1, $X_1'$ is $C_{2-10}$ alkenyl, and $X_1$, $R_5$ and n are as the same previously defined.

[Reaction Scheme 2]

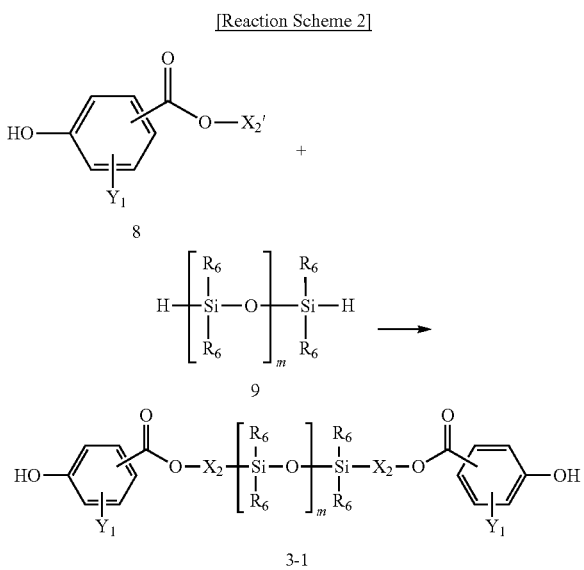

in the Reaction Scheme 2, $X_2'$ is $C_{2-10}$ alkenyl, and $X_2$, $Y_1$, $R_6$ and m are the same as previously defined.

In the Reaction Schemes 1 and 2, the reaction is preferably conducted in the presence of a metal catalyst.

As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2(COD)$, $PtCl_2$(benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane, octaphenylcyclotetrasiloxane and the like can be included.

The above organodisiloxane can be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than parts by weight or not more than 3 parts by weight, based on 100 parts by weight of the organocyclosiloxane.

In particular, by adjusting the content of the repeating unit represented by Chemical Formula 2 and the repeating unit represented by Chemical Formula 3, the physical properties can be adjusted.

Preferably, the weight ratio between the above repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 2-1 and the siloxane compound represented by Chemical Formula 3-1.

Preferably, the repeating unit represented by Chemical Formula 2 is represented by the following Chemical Formula 2-2:

[Chemical Formula 2-2]

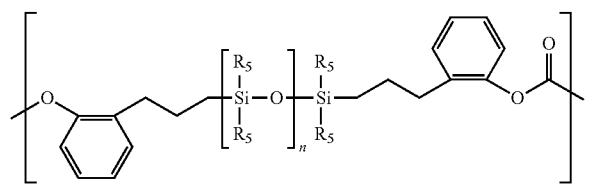

in the Chemical Formula 2-2, $R_5$ and n are the same as previously defined. Preferably, $R_5$ is methyl.

Also, preferably, the repeating unit represented by Chemical Formula 3 is represented by the following Chemical Formula 3-2:

[Chemical Formula 3-2]

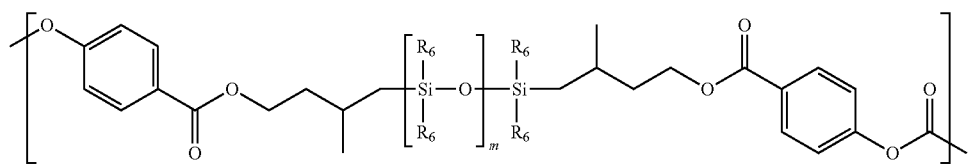

in the Chemical Formula 3-2, $R_6$ and m are the same as previously defined. Preferably, $R_6$ is methyl.

Further, preferably, the above copolycarbonate comprises all of the repeating unit represented by Chemical Formula 1-1, the repeating unit represented by Chemical Formula 2-2, and the repeating unit represented by Chemical Formula 3-2.

Further, the present invention provides a method for preparing the above-described copolycarbonate which comprises a step of polymerizing the aromatic diol compound, the carbonate precursor and one or more siloxane compounds.

The aromatic diol compound, the carbonate precursor and one or more siloxane compounds are the same as previously described.

During the polymerization, one or more siloxane compounds may be used in an amount of not less than 0.1% by weight, not less than 0.5% by weight, not less than 1% by weight, or not less than 1.5% by weight; and not more than 20% by weight, not more than 10% by weight, not more than 7% by weight, not more than 5% by weight, not more than 4% by weight, not more than 3% by weight or not more than 2% by weight, based on 100% by weight in total of the aromatic diol compound, the carbonate precursor and one or more siloxane compounds. Also, the above aromatic diol compound may be used in an amount of not less than 40% by weight, not less than 50% by weight, or not less than 55% by weight; and not more than 80% by weight, not more than 70% by weight, or not more than 65% by weight, based on 100% by weight in total of the aromatic diol compound, the carbonate precursor and one or more siloxane compounds. The above carbonate precursor may be used in an amount of not less than 10% by weight, not less than 20% by weight, or not less than 30% by weight; and not more than 60% by weight, not more than 50% by weight, or not more than 40% by weight, based on 100% by weight in total of the aromatic diol compound, the carbonate precursor and one or more siloxane compounds.

Further, as the polymerization method, an interfacial polymerization method may be used as one example. In this case, there is an effect in that the polymerization reaction can be made at low temperature and atmospheric pressure, and it is easy to control the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene may be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within this range, the required molecular weight can be obtained.

The above polycarbonate has a weight average molecular weight of 1,000 to 100,000 g/mol and more preferably 15,000 to 35,000 g/mol. More preferably, the above weight average molecular weight is not less than 20,000 g/mol, not less than 21,000 g/mol, not less than 22,000 g/mol, not less than 23,000 g/mol, not less than 24,000 g/mol, not less than 25,000 g/mol, not less than 26,000 g/mol, not less than 27,000 g/mol, or not less than 28,000 g/mol. Further, the above weight average molecular weight is not more than 34,000 g/mol, not more than 33,000 g/mol, or not more than 32,000 g/mol.

Copolycarbonate (B)

The polycarbonate (B) it is distinguished from the above-described copolycarbonate (A) in that a polysiloxane structure is not introduced in a main chain of the polycarbonate.

Preferably, the above polycarbonate comprises a repeating unit represented by the following Chemical Formula 4:

[Chemical Formula 4]

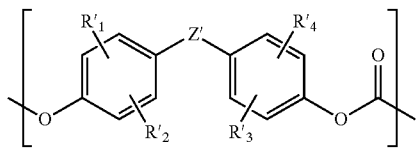

in the Chemical Formula 4, $R'_1$, $R'_2$, $R'_3$ and $R'_4$ are each independently hydrogen, $C_{1-10}$ alkyl, $C_{1-10}$ alkoxy, or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

Further, preferably, the above polycarbonate (B) has a weight average molecular weight of 1,000 to 100,000 g/mol and more preferably 10,000 to 35,000 g/mol. More preferably, the above weight average molecular weight (g/mol) is not less than 11,000, not less than 12,000, not less than 13,000, not less than 14,000, not less than 15,000, not less than 16,000, not less than 17,000, or not less than 18,000. Further, the above weight average molecular weight (g/mol) is not more than 34,000, not more than 33,000, not more than 32,000, not more than 31,000, not more than 30,000, or not more than 29,000.

The repeating unit represented by Chemical Formula 4 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$, $R'_2$, $R'_3$, $R'_4$ and $Z'$ in Chemical Formula 4 are the same as previously described for $R_1$, $R_2$, $R_3$, $R_4$ and $Z$ in Chemical Formula 1, respectively.

Further, preferably, the repeating unit represented by Chemical Formula 4 is represented by the following Chemical Formula 4-1:

[Chemical Formula 4-1]

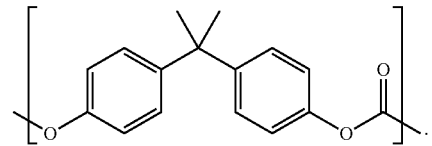

In addition, the method for preparing the polycarbonate (B) is the same as the method for preparing the copolycarbonate (A), except that one or more siloxane compounds are not used.

Copolycarbonate Resin Composition

The copolycarbonate resin composition according to the present invention comprises the above-described copolycarbonate (A) and optionally the above-described polycarbonate (B).

In the Equation 1, X means a silicon content (wt. %) in the copolycarbonate resin composition, which can be determined through NMR analysis. Also, since a siloxane structure is not introduced in the polycarbonate (B), X can be adjusted by adjusting the content of the polycarbonate (B) in the copolycarbonate resin composition.

Preferably, X is 0.1 to 20, more preferably 1 to 10 and most preferably 1.2 to 7.0. Further, In the Equation 1, Y can be determined through TD (Time-domain)-NMR FID experiment to be described below.

According to an embodiment of the present invention, it can be confirmed that the copolycarbonate resin composition according to the present invention is included in the range of Equation 1, whereas comparative example is not included in the range thereof, thereby deteriorating the mobility of the polymer structure. Also, it can be confirmed that the difference in the mobility may affect various physical properties.

More preferably, the copolycarbonate resin composition according to the present invention satisfies the following Equation 1-1:

$$1.0682 \times X + 0.60 < Y < 1.0682 \times X + 1.0 \quad \text{[Equation 1-1]}$$

in the Equation 1-1,

X and Y are the same as previously defined.

The copolycarbonate resin composition according to the present invention has a weight average molecular weight (g/mol) of 1,000 to 10,000 and more preferably 15,000 to 35,000. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

Further, the copolycarbonate resin composition according to the present invention has impact strength at room temperature of 750 to 1000 J/m as measured at 23° C. in accordance with ASTM D256 (⅛ inch, Notched Izod). More preferably, the impact strength at room temperature (J/m) is not less than 760, not less than 770, not less than 780, not less than 790, not less than 800, not less than 810, not less than 820, not less than 830, not less than 840, not less than 850, not less than 860, or not less than 870. Further, the impact strength at room temperature (J/m) is more excellent when the value is higher, and thus it is not limited to any upper limit. As one example, however, it may be not more than 990, not more than 980, or not more than 970.

Further, the copolycarbonate resin composition according to the present invention has impact strength at low temperature of 150 to 1000 J/m as measured at −30° C. in accordance with ASTM D256 (⅛ inch, Notched Izod). More preferably, the impact strength at low temperature (J/m) is not less than 160, not less than 170, not less than 180, not less than 190, or not less than 200. Further, the impact strength at low temperature (J/m) is more excellent when the value is higher, and thus it is not limited to the upper limit. As one example, however, it may be not more than 990, not more than 980, or not more than 970.

In addition, the copolycarbonate resin composition may further comprise one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes, if necessary.

Further, the present invention provides an article comprising the above-mentioned polycarbonate composition. Preferably, the above article is an injection molded article.

The method for preparing the article may comprise the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, the copolycarbonate composition according to the present invention comprising a copolycarbonate in which a polysiloxane structure is introduced in a main chain of the polycarbonate and optionally a polycarbonate, has characteristics satisfying a particular condition based on TD (Time-domain)-NMR FID analysis.

BRIEF DESCRIPTION OF DRAWINGS

FIG. 1 illustrates graphically the T2 relaxation measured according to the present invention.

DETAILED DESCRIPTION OF THE EMBODIMENTS

Preferred embodiments will be provided below in order to assist in the understanding of the present disclosure. However, these examples are provided only for illustration of the present invention, and should not be construed as limiting the present invention to these examples.

PREPARATION EXAMPLE 1

AP-34

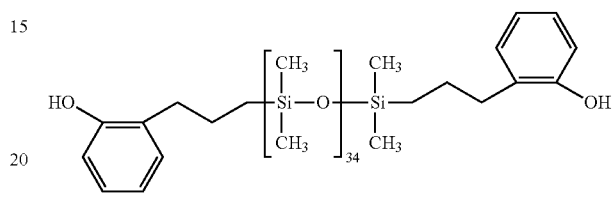

47.60 g (160 mmol) of octamethylcyclotetrasiloxane and 2.40 g (17.8 mmol) of tetramethyldisiloxane were mixed. The mixture was then placed in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'AP-34'. AP-34 was pale yellow oil and the repeating unit (n) was 34 when confirmed through $^1$H NMR using a Varian 500 MHz, and further purification was not required.

PREPARATION EXAMPLE 2

MB-58

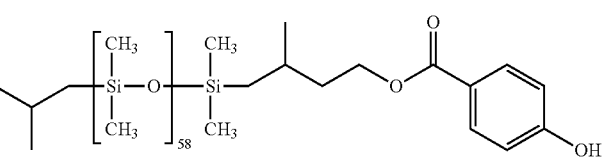

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (m) of the terminal-unmodified polyorganosiloxane thus prepared was 58 when confirmed through ¹H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'MB-58'. MB-58 was pale yellow oil and the repeating unit (m) was 58 when confirmed through ¹H NMR using a Varian 500 MHz, and further purification was not required.

PREPARATION EXAMPLE 3

EU-50

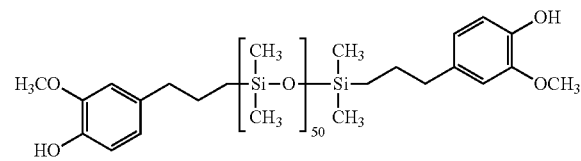

47.60 g (160 mmol) of octamethylcyclotetrasiloxane and 1.7 g (13 mmol) of tetramethyldisiloxane were mixed. The mixture was then placed in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 50 when confirmed through ¹H NMR.

To the resulting terminal-unmodified polyorganosiloxane, 6.13 g (29.7 mmol) of eugenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'EU-50'. EU-50 was pale yellow oil and the repeating unit (n) was 50 when confirmed through ¹H NMR using a Varian 500 MHz, and further purification was not required.

PREPARATION EXAMPLE 4

PC 1784 g of water, 385 g of NaOH and 232 g of BPA (bisphenol A) were added to a polymerization reactor, and dissolved with mixing under a N₂ atmosphere. 4.7 g of PTBP (para-tert butylphenol) was dissolved in MC (methylene chloride) and was added thereto. 128 g of TPG (triphosgene) was dissolved in MC and added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and then pH of a produced polymer was adjusted to neutral pH of 6 to 7 by washing three times with distilled water. The polymer thus obtained was re-precipitated in a mixed solution of methanol and hexane, and then dried at 120° C. to give a final polycarbonate, which was designated as 'PC'.

EXAMPLE 1

1784 g of water, 385 g of NaOH and 232 g of BPA (bisphenol A) were added to a polymerization reactor, and dissolved with mixing under a N₂ atmosphere. 4.3 g of PTBP (para-tert butylphenol) and 6.57 g of polydimethylsiloxane (the mixed solution (weight ratio: 90:10) of 5.91 g of AP-PDMS (n=34) prepared in Preparation Example 1 and 0.66 g of MBHB-PDMS (m=58) prepared in Preparation Example 2)) were dissolved in MC (methylene chloride) and then added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and then pH of a produced polymer was adjusted to neutral pH of 6 to 7 by washing three times with distilled water. The polymer thus obtained was re-precipitated in a mixed solution of methanol and hexane, and then dried at 120° C. to give a final copolycarbonate.

EXAMPLE 2

20 parts by weight of the copolycarbonate prepared in Example 1 and 80 parts by weight of the polycarbonate (PC) prepared in Preparation Example 4 were mixed to prepare the desired copolycarbonate composition.

EXAMPLE 3

40 parts by weight of the copolycarbonate prepared in Example 1 and 60 parts by weight of the polycarbonate (PC) prepared in Preparation Example 4 were mixed to prepare the desired copolycarbonate composition.

EXAMPLE 4

60 parts by weight of the copolycarbonate prepared in Example 1 and parts by weight of the polycarbonate (PC) prepared in Preparation Example 4 were mixed to prepare the desired copolycarbonate composition.

EXAMPLE 5

80 parts by weight of the copolycarbonate prepared in Example 1 and parts by weight of the polycarbonate (PC) prepared in Preparation Example 4 were mixed to prepare the desired copolycarbonate composition.

COMPARATIVE EXAMPLE

The copolycarbonate was prepared in the same manner in Example 1, except that 6.57 g of EU-50 prepared in Preparation Example 3 was used as the polydimethylsiloxane.

EXPERIMENTAL EXAMPLE

With respect to 1 part by weight of the copolycarbonate or copolycarbonate composition prepared in the examples and comparative example, 0.050 parts by weight of tris(2,4-di-tert-butylphenyl)phosposphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a ϕ30 mm twin-screw extruder provided with a vent, and was injection-molded at a cylinder temperature of 300° C. and a mold temperature of 80° C. using an injection molding machine N-20C (manufactured by JSW, Ltd.) to prepare a molded specimen.

The physical properties of the above specimens were determined by the following method:

1) Weight average molecular weight (Mw): measured by GPC using PC standard with Agilent 1200 series.

2) Impact strength at room temperature: measured at 23° C. in accordance with ASTM D256 (⅛inch, Notched Izod).

3) Impact strength at low temperature: measured at −30° C. in accordance with ASTM D256 (⅛inch, Notched Izod).

4) Silicon content (wt. %): The silicon content was measured through NMR analysis.

5) TD (Time-domain)-NMR HD experiment: Experimental setup was made using the minispec mq20 Polymer Research System in accordance with "Minispec standard operating procedure manual of SOP-0274-0k Bruker Optics Inc." to obtain FID data.

The results thus obtained were shown in Table 1 below and the results of TD (Time-domain)-NMR FID experiments were shown in FIG. 1.

In FIG. 1, X-axis means a silicon content (wt. %) in the copolycarbonate composition, and Y-axis means a normalized FID intensity measured in TD (Time-domain)-NMR FID experiments.

TABLE 1

| | Mw (g/mol) | Impact strength at room temperature (J/m) | Impact strength at low temperature (J/m) | TD-NMR Fid X | TD-NMR Fid Y |
|---|---|---|---|---|---|
| Example 1 | 30000 | 889 | 732 | 6.23 | 7.364 |
| Example 2 | 24100 | 807 | 190 | 1.26 | 2.008 |
| Example 3 | 25400 | 822 | 243 | 2.45 | 3.374 |
| Example 4 | 27200 | 830 | 641 | 3.75 | 4.780 |
| Example 5 | 28400 | 849 | 707 | 4.77 | 5.752 |
| Comparative Example | 26100 | 802 | 679 | 4.92 | 6.466 |

As shown in Table 1 and FIG. 1, it could be confirmed that in the case of Examples according to the present invention, X and Y satisfied the Equation 1, whereas in the case of Comparative Example, X and Y did not satisfy the Equation 1. Thus, particularly, it could also be confirmed that there was a difference in the impact strength at room temperature.

The invention claimed is:

1. A copolycarbonate composition comprising:
a copolycarbonate comprising an aromatic polycarbonate-based first repeating unit and one or more aromatic polycarbonate-based second repeating units having siloxane bonds, and
a polycarbonate,
wherein the copolycarbonate composition has an impact strength at room temperature of 830 to 1000 J/m as measured at 23° C. in accordance with ASTM D256 (⅛ inch, Notched Izod),
wherein the one or more aromatic polycarbonate-based second repeating units having siloxane bonds comprise a repeating unit represented by Chemical Formula 2 and a repeating unit represented by Chemical Formula 3:

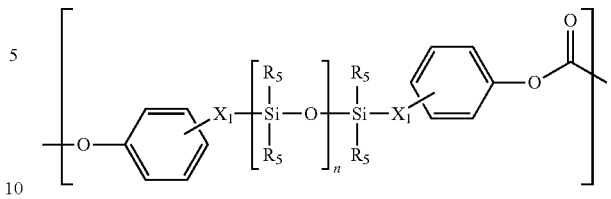

[Chemical Formula 2]

in Chemical Formula 2,
each of $X_1$ is independently $C_{1-10}$ alkylene,
each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n is an integer of 10 to 50,

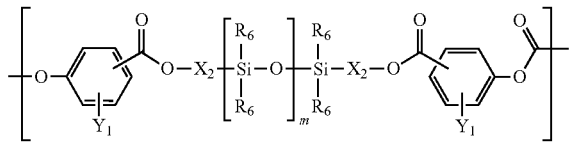

[Chemical Formula 3]

in Chemical Formula 3,
each of $X_2$ is independently $C_{1-10}$ alkylene,
each of $Y_1$ is independently hydrogen, $C_{1-6}$ alkyl, halogen, hydroxy, $C_{1-6}$ alkoxy, or $C_{6-20}$ aryl,
each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 55 to 80, and
wherein the copolycarbonate composition satisfies the following Equation 1:

$$1.0682 \times X + 0.51 < Y < 1.0682 \times X + 1.2 \quad \text{[Equation 1]}$$

in the Equation 1,
X means a silicon content (wt. %) relative to the total weight of the copolycarbonate and polycarbonate, and
Y means a value in which the FID intensity obtained through TD (Time-domain) FID experiment is normalized at 0.1 msec.

2. The copolycarbonate composition of claim 1, wherein X is 0.1 to 20.

3. The copolycarbonate composition of claim 1, wherein the copolycarbonate composition satisfies the following Equation 1-1:

$$1.0682 \times X + 0.60 < Y < 1.0682 \times X + 1.0 \quad \text{[Equation 1-1]}$$

in the Equation 1-1,
X and Y are the same as defined in claim 1.

4. The copolycarbonate composition of claim 1, wherein the copolycarbonate composition has a weight average molecular weight (g/mol) of 1,000 to 100,000.

5. The copolycarbonate composition of claim 1, wherein the aromatic polycarbonate-based first repeating unit is represented by the following Chemical Formula 1:

[Chemical Formula 1]

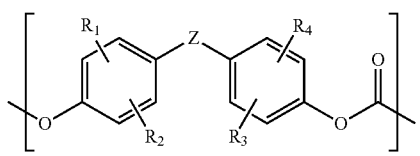

in the Chemical Formula 1,
$R_1$, $R_2$, $R_3$ and $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

6. The copolycarbonate composition of claim 1, wherein the aromatic polycarbonate-based first repeating unit is derived from one or more aromatic diol compounds selected from the group consisting of bis(4-hydroxyphenyl)methane, bis(4-hydroxyphenyl)ether, bis(4-hydroxyphenyl)sulthne, bis(4-hydroxyphenyi)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

7. The copolycarbonate composition of claim 1, wherein the aromatic polycarbonate-based first repeating unit is represented by the following Chemical Formula 1-1:

[Chemical Formula 1-1]

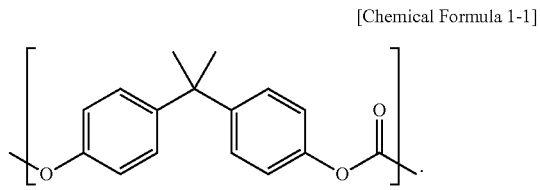

8. The copolycarbonate composition of claim 1, wherein the repeating unit represented by Chemical Formula 2 is represented by the following Chemical Formula 2-2:

[Chemical Formula 2-2]

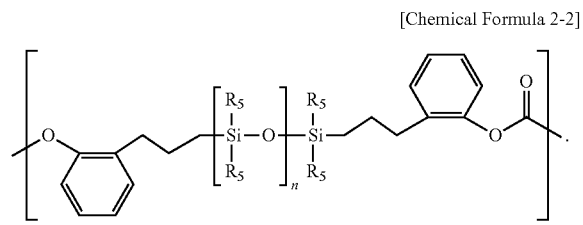

9. The copolycarbonate composition of claim 1, wherein the repeating unit represented by Chemical Formula 3 is represented by the following Chemical Formula 3-2:

[Chemical Formula 3-2]

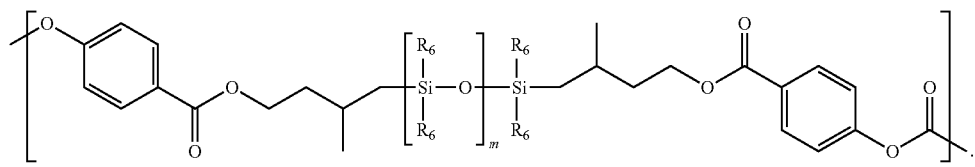

10. The copolycarbonate composition of claim 1, wherein a polysiloxane structure is not introduced in a main chain of the polycarbonate.

* * * * *